June 30, 1964  S. P. WILLITS  3,139,246
AUTOMATIC OPTICAL GUIDING SYSTEM
Filed Jan. 23, 1958  7 Sheets-Sheet 3
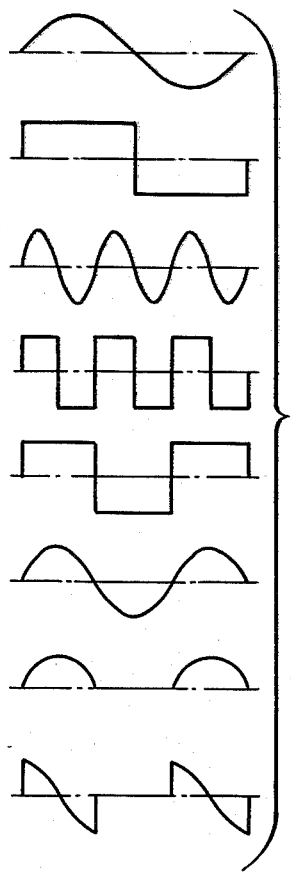
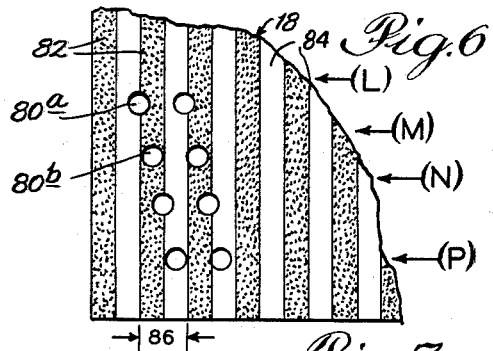
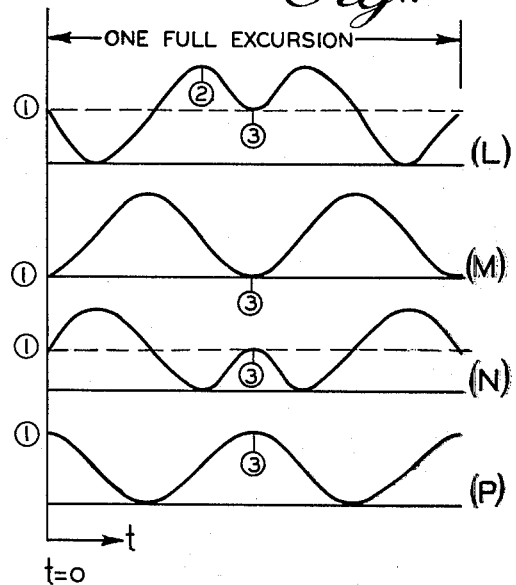
INVENTOR:
Samuel P. Willits,
BY Louis Bernat.
ATTORNEY.

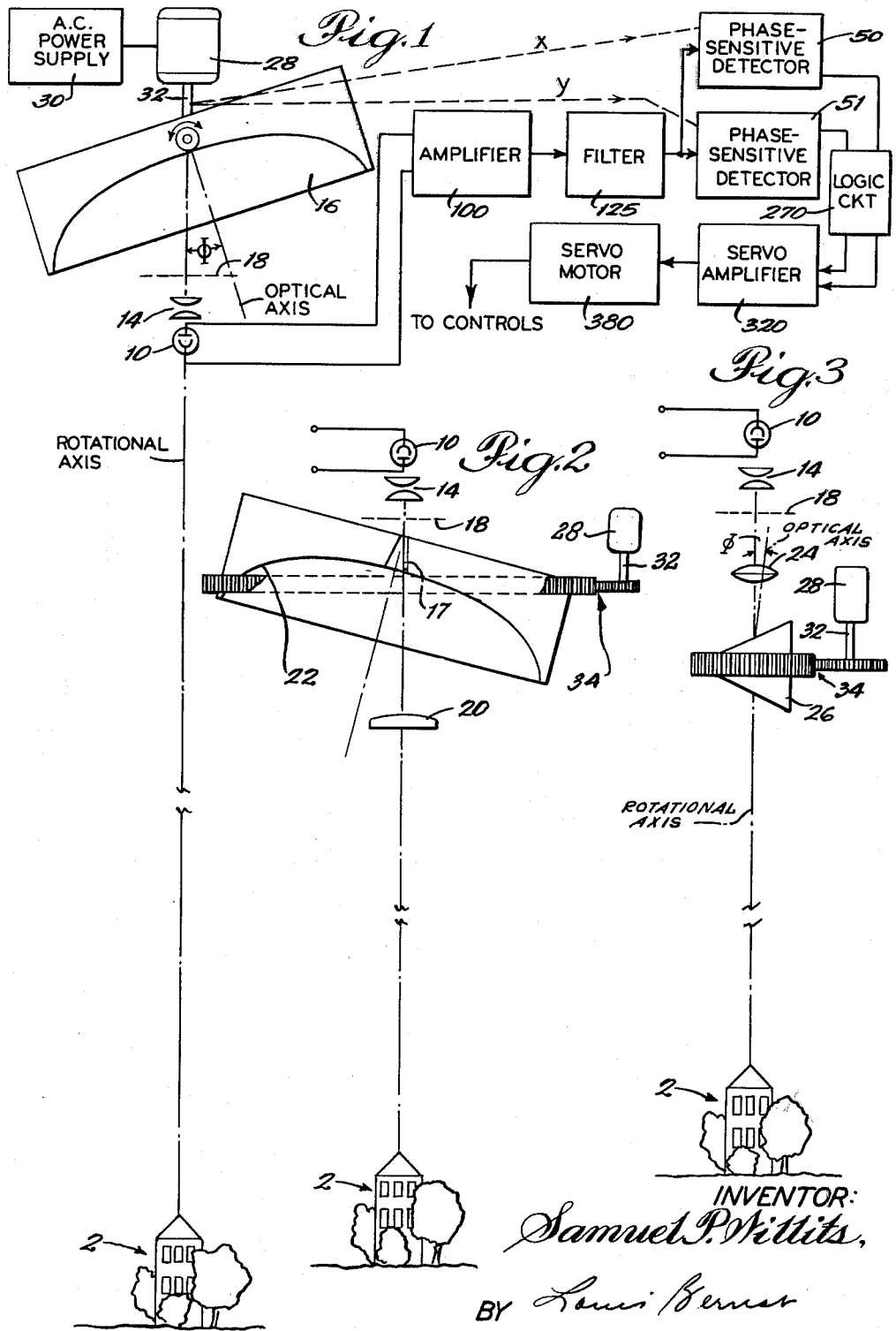

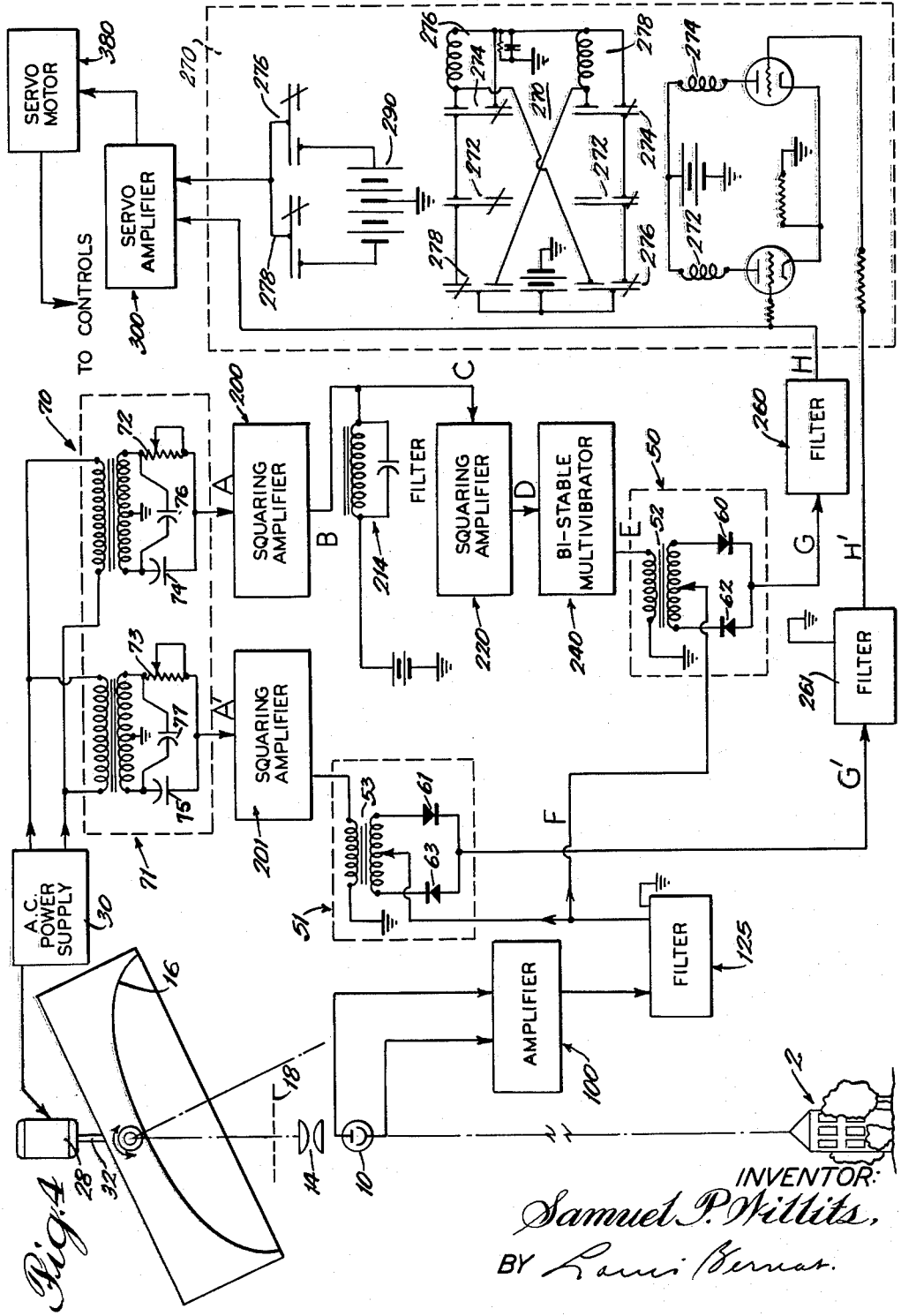

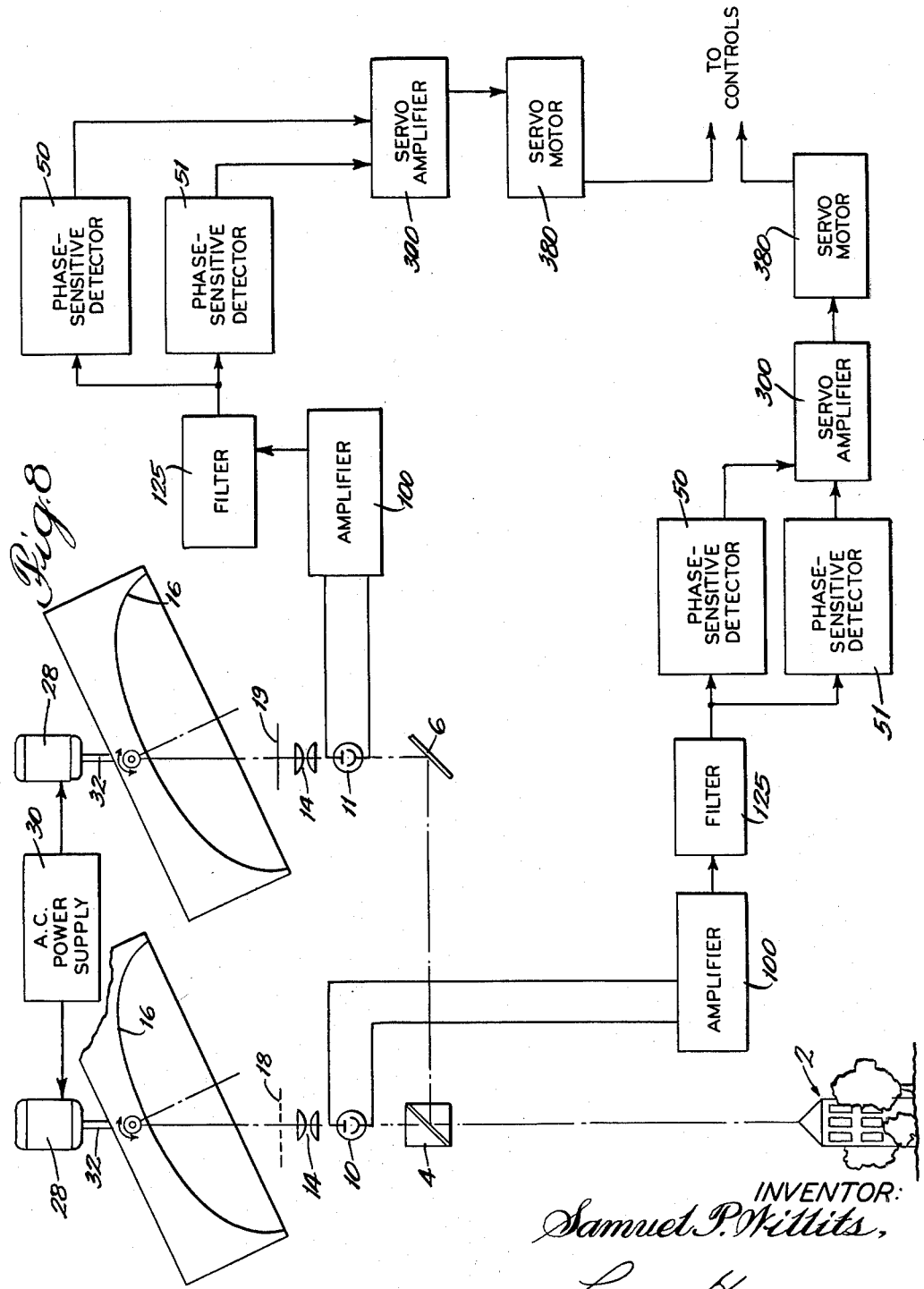

June 30, 1964 S. P. WILLITS 3,139,246
AUTOMATIC OPTICAL GUIDING SYSTEM
Filed Jan. 23, 1958 7 Sheets-Sheet 5

INVENTOR:
Samuel P. Willits,
BY Louis Bernor
ATTORNEY.

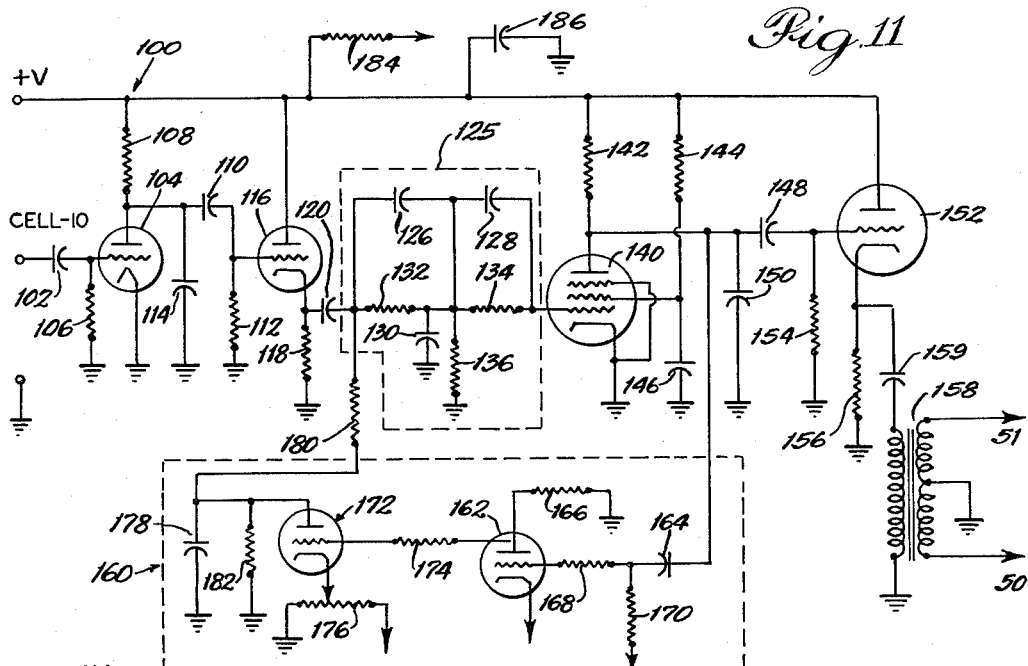
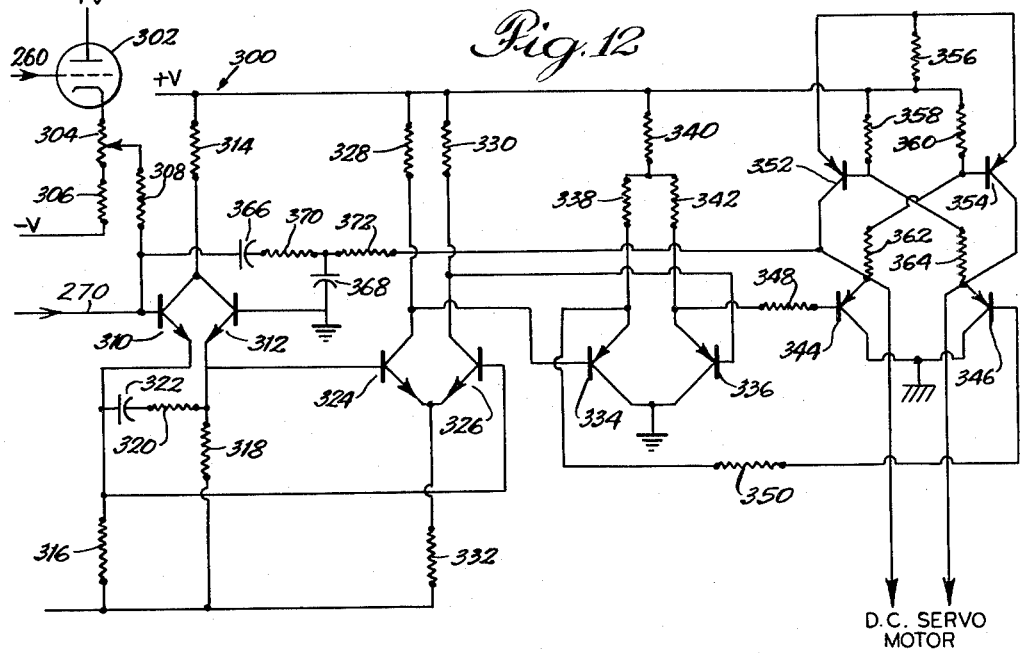

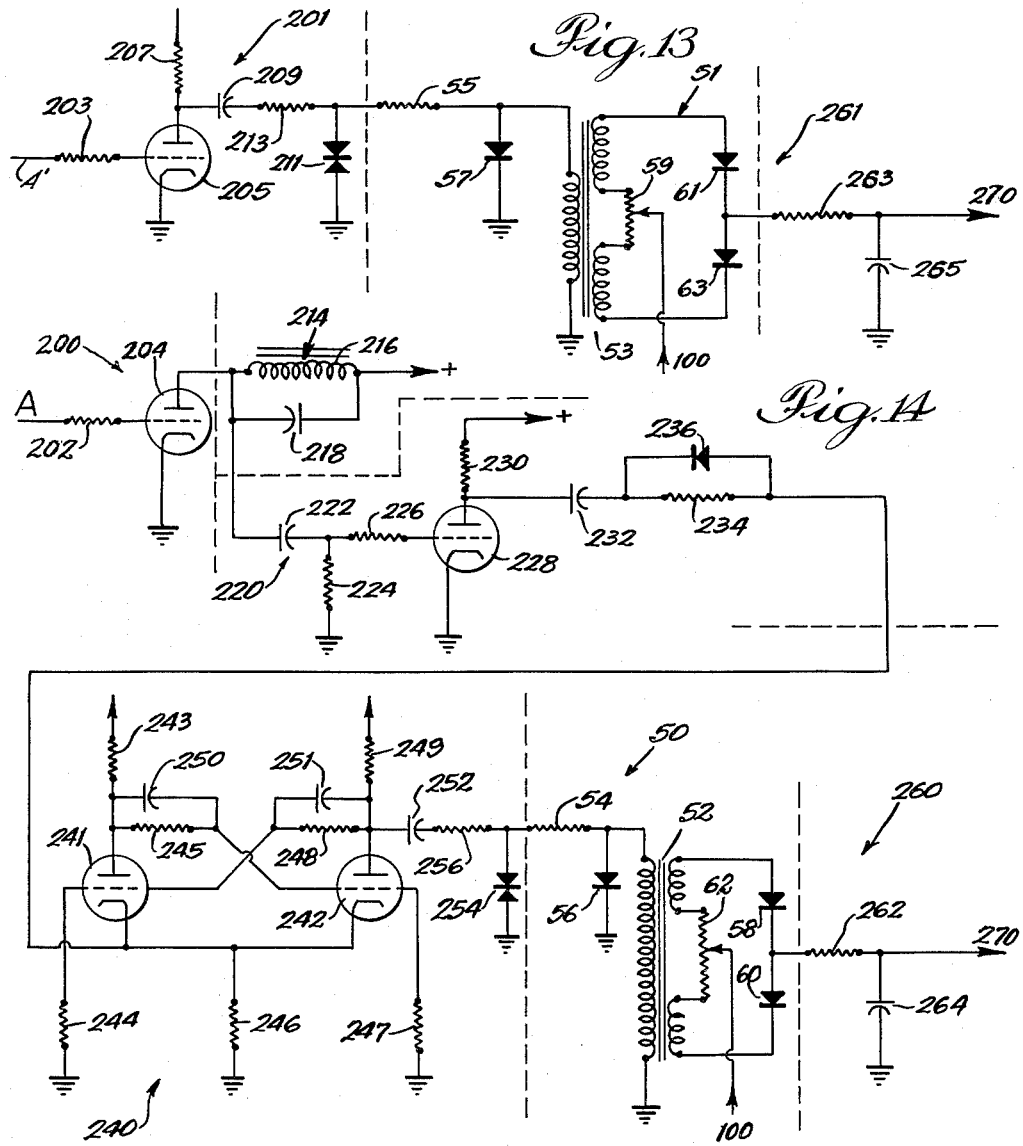

United States Patent Office 3,139,246
Patented June 30, 1964

3,139,246
AUTOMATIC OPTICAL GUIDING SYSTEM
Samuel P. Willits, Mount Prospect, Ill., assignor, by mesne assignments, to Chicago Aerial Industries, Inc., Melrose Park, Ill., a corporation of Delaware
Filed Jan. 23, 1958, Ser. No. 710,770
25 Claims. (Cl. 244—14)

This invention relates in general to guidance systems, and more particularly to new and useful improvements in a guidance system employing optical-electronic means for detecting relative angular motion between a vehicle and a pre-selected area, and for utilizing this information to guide the vehicle toward the pre-selected area.

Manifestly, a system for maintaining the aim of a device relative to a pre-selected target has many useful applications. Thus, the hovering of a helicopter over a specified object could be automatically controlled by such a system. Further, such a system could be used to guide a transporting aircraft nearer or toward the proximate location of an interesting piece of terrain viewed during aerial reconnaissance. Still further, aerial vehicles, such as missiles, could be directed at a specified target area from a remote point with such a system.

It will be appreciated by those skilled in the art that the value of such a system would be greatly enhanced if it were capable of selecting a succession of new target scenes within the originally sought general target, and only therein, as the distance between the vehicle and the target is diminished and as the visual character of the original scene changes from a comparatively indistinct target to a plurality of distinct targets.

Many homing devices are known and have been used in the prior art, but these prior art devices have not proved to be completely satisfactory. In a majority of such systems continuous observations by a human operator or distinct electro-magnetic radiations from a discrete object are required. Clearly, devices of the former type are limited in their scope of application, while those of the latter type are burdened by the fact that they cannot distinguish a single target from a group of similar objects without an operator.

Accordingly, it is a general object of my invention to provide a new and improved guidance system which overcomes the limitations of existing systems of this type.

It is a more particular object of my invention to provide a new and improved guidance system which requires no direction by a human being, after once having been correctly aimed, and which is limited in range and capability only by the operator's ability to select a general target scene.

It is a further object of my invention to provide such a new and improved guidance system which is capable of detecting and measuring within its field the angular motion of a general target scene relative to the vehicle carrying the system.

It is a still further object of my invention to provide a guidance system as described above capable of detecting and measuring the relative angular motion of a general target scene and, in response thereto, generating electrical signals capable of directing the vehicle so as to maintain its aim on the general target scene.

It is another object of my invention to provide a new and improved guidance system which is characterized by its relative simplicity, its high degree of accuracy, and its relatively compact construction.

These and other objects are realized in accordance with a specific illustrative embodiment of the invention wherein a vehicle is provided with means for generating electrical signals which are modulated by the relative angular movements, real or apparent, of the target area, means for demodulating the signals in order to generate the control information and means for employing this control information so as to direct the vehicle such that it sustains its view of the selected target area.

The basic principles of the invention can best be understood by considering two moving objects, one object is the seeker and the other the sought object, or by considering a moving object and a relatively fixed location wherein one is the seeker and the other being sought, between which there is relative motion or velocity. In some circumstances it may be desirable for the first object to maintain its surveillance of the second object or of the location, and in other circumstances it may be advantageous for the location to maintain its surveillance of the object once such surveillance has been established.

Those skilled in the art will recognize that illustrative circumstances of this type can be found in anti-aircraft fire control, aerial reconnaissance and in the various types of missile guidance, including air-to-air, air-to-ground, and ground-to-ground.

One of the problems which has not been successfully solved by prior art systems is that of selecting some characteristic of the object or location by which surveillance thereof may be maintained regardless of any relative motion which may be encountered. Also, it will be appreciated that an additional problem arises in that the characteristic selected for maintaining surveillance might be amenable to permitting the original establishment of the surveillance but not to its continuance.

Guidance systems by which surveillance can be maintained generally are dependent upon electro-magnetic radiations of some sort for transmittal of information about the target or scene. These electro-magnetic radiations may be radio waves, visible or ultra-violet light, infra-red radiations, and radiations that produce ionization. Of course, the appropriate type of detector must be used in each respective case.

As is known in the art, such systems are considered to be "active," if they transmit radiations which are reflected from the target back to the device, and such systems are considered to be "passive," if they accept radiations from the target which are not originated in the system. Those skilled in the art will readily appreciate that passive devices are generally preferable because generating equipment is not required; and, therefore, the device is greatly simplified. In addition, passive devices have the additional advantage of being more difficult to detect by non-authorized observers.

There are special circumstances where the target consists of an array of objects having characteristics slightly different or indistinguishable from the characteristics of its surroundings. However, even in such circumstances, there exists a certain amount of normal contrast or diversity in the character of adjacent parts or objects. For example, forests have variations in color when viewed from the air because of the different densities in the foliage, and factory areas have variations due primarily to the several reflectivities of the materials of construction.

Heretofore, no satisfactory passive system of maintaining surveillance of a target area has been available. Such a system is provided in accordance with the present invention which utilizes the normal variations in contrast presented by target areas rather than the variations presented by specific target points or objects. In accordance with a specific embodiment of the invention, these normally existing distributions of contrast in target areas are utilized in generating signals comprising a family of harmonics. Advantageously, these generated signals are modulated by the relative movements of the target area and means are provided for the subsequent demodulation of the signals in order to generate control information which is used to maintain the surveillance of the target area.

The invention may be utilized with any suitable means for establishing original surveillance in the target area, as for example, a servo radar system or a multi-sensor sighting system. The only requirement on the establishment of original surveillance which is embodied by the invention is that the system for originally perceiving the target area does not preclude or limit in any way perception by the sensor arrangements utilized in the invention. As the sighting systems referred to above generally are well known in the art and as such do not form a part of the invention, no further discussion of such sighting systems is deemed to be necessary.

In accordance with the features of specific and illustrative embodiments of the invention, the guidance system comprises a radiation sensitive device or devices adapted to generate electrical signals representative of the selected target. The radiation sensitive device or devices are associated with optical means which direct the radiation signal data towards the radiation sensitive device. Drive means coupled to the optical means cause the radiation signal data received by the radiation sensitive device to be modulated in accordance with the relative motion between the sensor and the target area.

The output of the radiation sensitive device is demodulated into control signals which are utilized to maintain the surveillance of the target area by the vehicle carrying the guidance system.

These and other features of the invention will be more readily understood from the following specification and the accompanying drawing in which:

FIGURE 1 is a block diagrammatic view of an illustrative guidance system embodying the invention;

FIGURE 2 is an alternative embodiment of the optical system comprising a Cassegrainian reflector, suitable for use in the guidance system shown in FIGURE 1;

FIGURE 3 is a further alternative embodiment of the optical system comprising a rotatably mounted prism suitable for use in the guidance system shown in FIGURE 1;

FIGURE 4 is an illustrative diagrammatic showing, partially in block and partially in schematic form, of the electronic circuits of the invention;

Figure 10:
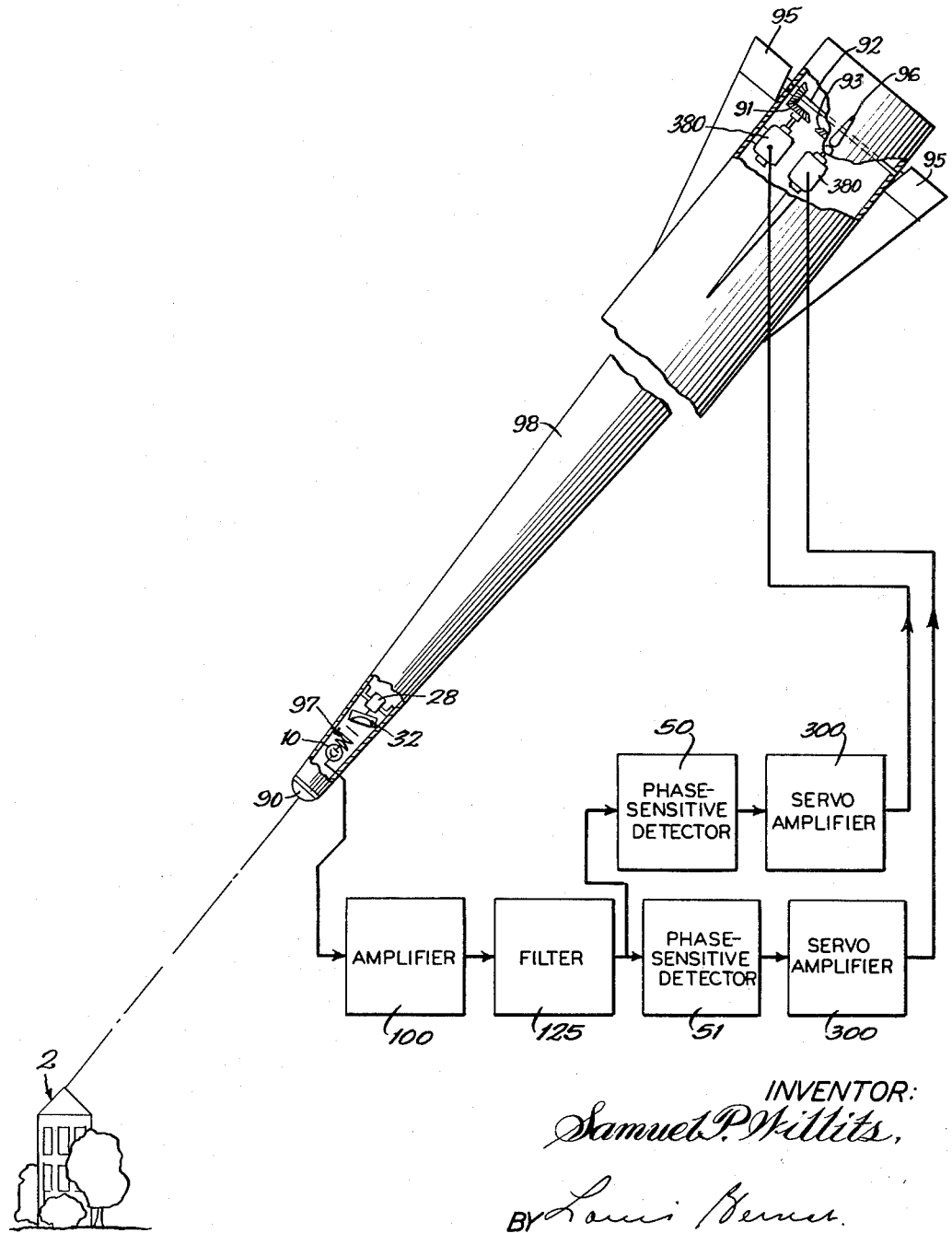

FIGURES 5, 6, and 7 illustrate one type of striated plate which advantageously may be utilized in the invention and illustrative wave forms of the electrical signals generated therein;

FIGURE 8 is a diagrammatic showing, primarily in block from, of an alternative embodiment of the invention capable of providing two-axis operation.

FIGURE 9 is a diagrammatic representation of a perforated plate which advantageously may be used in the optical system shown in FIGURE 1.

FIGURE 10 is a diagrammatic showing, primarily in block form, of a second alternative embodiment of the invention capable of providing two-axis operation.

FIGURE 11 is a schematic representation of illustrative amplifier and filter circuits which advantageously may be utilized in the circuit shown in FIGURE 1.

FIGURE 12 is a schematic representation of a servo amplifier suitable for use in the guidance system shown in FIGURE 1.

FIGURE 13 is a schematic representation of the squaring amplifier and the phase detector circuits which may be utilized in the guiding system shown in FIGURE 1; and FIGURE 14 is a schematic representation of the composite squaring amplifier, frequency multiplier, bi-stable multivibrator, and phase detector circuitry suitable for use in the guidance system generally shown in FIGURE 1.

Referring now to the drawings, and more particularly to FIGURE 1 thereof, there is illustrated a specific illustrative embodiment of a guidance system in accordance with the invention which comprises a radiation sensitive device, such as photocell 10, positioned in an optical arrangement and electrically connected to an amplifier 100. The sensing element 10, such as a photocell, is adapted to receive the modulated light from the space filtered image of a source scene or target shown generally at 2, through appropriate optical elements such as condensing lens 14, concave mirror 16 and a space filtering element shown in this instance as a striated plate illustrated at 18 and positioned at the focal plane of the mirror 16, wherein the distance along the optical axis to the source scene 2 being substantially infinite or many times greater than the focal length of the mirror 16. In the embodiment shown and described herein, with reference to FIG. 1, mirror 16 may be of a two inch dimension having a frontal surface describing an F1 paraboloid. The expression "space filtering" as used herein may be defined as the inherent image light distribution detecting capability of an optical system containing a filter plate having one or more optical apertures through which the image of a source scene containing two or more contrast gradients is projected. The space filtering action is due to the spacing of the contrast gradients in the image relative to the spacing or pitch of the optical apertures in the filter plate. If the spacing of two contrast gradients is the same as the pitch of the optical apertures, gradient reinforcement is at a maximum and, if the space filtered image were projected onto a radiation sensor, the sensor output signal would also be at a maximum. Since the output signal of a single radiation sensor is the vector sum of all the contrast gradients to which it is exposed, it is clear that any spacing of two contrast gradients other than optical aperture pitch will result in reduced reinforcement and reduced sensor output signal. When the contrast gradients spacing is ½, 1½, 2½, etc., times that of the optical aperture pitch, cancellation is complete. Because the contrast gradients in nature follow a random distribution, certain gradients are reinforced or emphasized and others cancelled, the net effect being known as "space filtering."

In accordance with the preferred embodiment of the invention, suitable means, as for example the motor 28 is energized by an A.C. power supply 30 to revolve at a speed of approximately 12,000 r.p.m., is associated with the mirror 16 for rotating the mirror 16 through shaft 32 to oscillate thereby the image of source scene 2 across the surface of the striated plate 18. This oscillation of the source scene image 2 across the striated plate 18 results in the production of an alternating current output from the photocell 10, which output is applied to the amplifier 100. This alternating output may be achieved equally well by other schemes as by oscillating the striated plate 18. Thus, the image may be moved relative to the plate or the plate relative to the image. Any type of motion, elliptical, rosetted, eccentric, and so forth, may be employed; but of these types, circular movement has been found to be the most practical and, therefore, is preferred. The angle Φ of mirror 16, may be changed rather than remaining fixed in order to achieve the desired result.

The photocell 10 may be generally described as a radiation sensitive device or sensor wherein the following elements may be used; such as a photoconductive cell, photo emissive cell, photoelectro magnetic cell, photopneumatic cell, photovoltaic cell, and the like.

The optical axis of mirror 16 is so arranged with respect to its rotational axis that an appropriate angle, Φ, shown exaggerated in order to facilitate illustrating the relationship, exists between these two axes. In this manner, individual areas or points of contrast in the image of the source scene 2 can be caused to follow a circular excursion on the striated plate 18. Although the striated plate may take several advantageous forms, depending on the kind of sensing desired, in one preferable embodiment of the scanner element, such as a modulating screen, the striated plate 18 comprises a plurality of parallel bands or spacings of uniformly spaced, opaque and transparent material alternately positioned, specifically a 5/32 inch O.D. plate circular in shape and having fifty opaque lines per inch. With this configuration, the circular excursion of the image of the source scene 2 across the striated plate 18 generates a harmonic function. Generally, the angle Φ is chosen to cause the image of a point source to nutate across one opaque and one transparent band of plate 18.

In other embodiments, not shown, wherein the relative motion of the image and the striated plate takes a form other than the form of circular motion, it has proved advantageous either to employ a striated plate with bands of other than equal width or to permit the angle Φ to subtend an amount of the plate other than one which permits an image excursion over two adjacent bands of plate 18.

Changes in the location of the image excursion on plate 18 correspond to the relative angular motions of the source scene. The output of photocell 10 varies in accordance with such changes in location. Stated in another manner, the alternating current output of photocell 10 is modulated by the relative angular motion of the source scene 2.

Suitable system circuitry may be utilized by connecting the filter 125 to the output of the amplifier 100; the signals are then transmitted to the demodulators or phase sensitive detectors 50 and 51; the outputs of the detectors 50 and 51 are connected through a logic circuit 270 to the servo amplifier 320 and the servo motor 380. This basic circuitry accepts the output of photocell 10 and amplifies, filters and demodulates the output so as to convert the definitive intelligence contained therein to signals suitable for re-establishing the original location of the excursion on the scanner or plate 18 of the image of scene 2 by causing a relocation of the optical elements or by modifying the control information to the vehicle, wherein suitable circuitry directs the control device so that the magnitude of the radius vector substantially corresponds with the direction of the velocity vector, wherein the magnitude of the radius vector of the device of the invention is ultimately drawn to a selected source or target scene 2. Thus, the invention serves to maintain the surveillance of the same source scene 2 by the sensor 10 as was under surveillance when the system circuitry was activated.

In the embodiment shown and described herein, the invention achieves an angular resolution of better than one milliradian. This allows detection of relative angular motions of the target area as small as 1/20 of a degree.

In addition to the particular optical arrangement shown and described with respect to FIGURE 1, other configurations of optical arrangements may be employed with equally advantageous results, for example in FIGURE 2 of the drawing there is shown an optical system comprising lens 14, a striated plate 18, and a Cassegrainian reflector made up of the convex mirror 20 and rotatably mounted concave mirror 22. An A.C. motor 28 is coupled through shaft 32 and gearing 34 to the rotatably mounted concave mirror 22 to the end that energization of motor 28 by the A.C. power supply 30 rotates mirror 22 to oscillate the source scene image across the striated plate 18. The hole 17 is positioned and designed in the mirror 22 so that there is substantially no loss of the essential scenic information due to the rotation of the mirror 22 about its rotational axis.

In another advantageous optical assembly, illustrated in FIGURE 3, a lens 14 is provided together with a striated plate 18, a focusing lens 24 and a rotatably mounted prism 26 so as to oscillate the source scene image across the striated plate 18. In this embodiment the motor 28 is coupled to the gearing 34 by means of a motor shaft 32 for causing the rotatably mounted prism 26 to be rotated as desired to produce a corresponding result.

It will be understood by those skilled in the art that any of the optical assemblies described above or any other suitable optical assembly may be used in the instant invention for causing the photocell 10 to have an output which contains intelligence that represents relative motion between the source scene 2 and the optical axis of the lens 14 and the striated plate 18. The demodulator output containing this definitive or useable intelligence, which may be in the form of pulses, when filtered, provides a varying D.C. signal having an amplitude which is a function of the relative position of the source scene. Because the signal representing the frequency of image oscillation contains, in addition to this intelligence, certain minor spurious information resulting from the component of image motion parallel to the bands of the striated plate 18, preferably such spurious signals should be extracted by filter 125 from the output of photocell 10 before the signals are fed to the inputs of the demodulators 50 and 51.

Demodulators 50 and 51 advantageously may comprise transformer-and-diode circuits or functionally equivalent circuit elements, such as commutators suitably arranged and synchronized with the image oscillating means, as for example on shaft 32 of motor 28 as indicated by the dotted lines X and Y of FIGURE 1. The basic requirements in accordance with the invention are that the demodulators accept the output wavetrain of the optical assembly and photocell 10; educe that component of the output which consists of an alternating voltage whose frequency is a selected multiple of the image oscillation frequency, i.e. educe a selected harmonic carrier; and with suitable filtering, present the intelligence borne by the carrier as an essentially D.C. voltage substantially proportional to the product of the amplitude of the carrier wave and the cosine of the phase angle between the carrier and a selected reference.

In FIG. 4, the phase-sensitive detectors 50 and 51 respectively are shown as comprised of transformer-and-diode circuits. With these circuits, reference voltages are necessary for reducing the signals developed by the photocell 10 to useful intelligence; and in accordance with an aspect of this invention, the A.C. voltage output of the power supply 30, suitably modified, may conveniently be employed as this reference voltage.

In order to relate the reference voltage to the mirror rotation, and therefore to the frequency of image oscillation, phase adjusters 70 and 71 are provided, which phase adjusters are connected through suitable transformers to the power supply 30. The phase adjusting can conveniently be achieved by utilizing those signals from photocell 10 developed by a stationary point source of light with the phase regulation being achieved through variable resistors 72 and 73 and condensers 74, 75, 76 and 77. During this calibration the phase detected output will be at a maximum when the reference voltage from power supply 30 and the signal from photocell 10 which results from the image of a stationary point source of light emanation are in phase, and this output will be averaged zero by the filters 260 and 261 when the reference voltage and the signal from photocell 10 are 90° out of phase. In order to provide the strongest possible control signal, the phase of the reference voltages are adjusted so that the signal from photocell 10 and the reference voltage are in phase. When two demodulators 50 and 51 are used, as shown in FIGURE 4, two different positions of the stationary light or emanation source 2 must be employed because the two demodulators 50 and 51 operate on different carrier frequencies and a single light position can produce maximum amplitude signal for only one demodulator.

When motor 28 is an ordinary synchronous motor, phase adjusting in the manner described above must be performed each time the motor is started, otherwise an indeterminant phase relationship will exist between the mirror rotation and the reference voltage and unusable control signals will be developed. However, when motor 28 is a synchronous polarized hysteresis motor, phase adjusting is required only during the original assembly because this type of motor locks in phase at only one point in the frequency wave form of its power supply; and hence, once adjusted, the phase relationship between the mirror rotation and the reference voltage will remain essentially constant. It will be appreciated by those skilled in the art that phase adjusters 70 and 71 shown in FIGURE 4 are merely representative of one type of phase adjuster which may be used to advantage in the invention and that other types, as for example, synchros, inductive capacitance networks and the like may be used with equally advantageous results.

As the basic requirement of the demodulators 50 and 51 is, as stated above, the extraction from the photocell output of an alternating voltage whose frequency is a selected multiple of the image oscillation frequency, the demodulators may take the form of commutators arranged with the image oscillating means, i.e., with motor 28, as illustrated by the broken lines $x$ and $y$ in FIGURE 1. For example, a two-bar commutator arranged with shaft 32 could be made to deliver information available from the second harmonic carrier contained in the output of the photocell 10. Similarly, a three-bar commutator arranged with shaft 32 could be made to deliver information available from the third harmonic carrier; and so on. It will be appreciated that when commutators are employed as the phase-sensitive demodulators, rather than the transformer-and-diode circuits described above, referencing and phasing are achieved by properly positioning the commutators in accordance with the null or selected zero position of the image on the striated plate 18.

Operation of the guidance system embodiment shown in FIGURE 4 will become more apparent from the following description, for example, with motor 28 driving shaft 32 at a rate of rotation in revolutions per unit time equal to one-half the output frequency of the power supply 30, the voltage reference to demodulator 51 represents the second harmonic of the mirror frequency, and the voltage reference to demodulator 50 is made to represent the third harmonic of the mirror frequency by means of the frequency converting circuit comprising filter 214, squaring amplifier 220 and a bi-stable multivibrator 240.

Power supply 30 may be a 400-cycle source and the signals from phase adjusters 70 and 71 to the squaring amplifiers 200 and 201 respectively, are of a 400-cycle frequency differing in phase. These signals are shown as signal A and signal A' respectively. Signal B, as shown in FIGURE 5, to the filter 214 from squaring amplifier 200 is a 400-cycle square wave due to the clipping action of the squaring amplifier. Signal C, which appears at the output of the filter 214, has a frequency of 1200 cycles when the filter 214 is advantageously tuned to select the third harmonic of the square wave B. Signal C is passed through squaring amplifier 220; and as a result of the clipping action of this squaring amplifier, signal C is modified to a square wave form as shown by D in FIGURE 5. It shall be understood that, by way of illustration, this disclosure restricts the system to the frequencies, fundamentals and harmonics, so indicated; but other frequencies, higher or lower, may be used.

Since the desired third harmonic reference in this example, must be of a 600 cycle frequency a trigger circuit or bi-stable multivibrator 240 is utilized as a frequency divider so as to rationally divide the frequency of signal D in a ratio of 2 to 1 rational, shown as signal E in FIGURE 5. It shall be understood that other frequency ratios may be used. This could be accomplished by the bi-stable multivibrator by rational division of signal B in the ratio of 2:3, for example.

Signal E is used for demodulating the 600 cycle component of signal F from filter 125. When the two signals are in phase, a series of sine loop pulses defining signal G is produced. Signal F further represents the situation wherein the output of photocell 10 contains the fundamental and the third harmonic frequency wherein the fundamental frequency has been removed by filter 125. Also, when the reference frequency and signal F are exactly in phase, the phase detected output $G_1$ is a maximum. If the reference frequency and signal F are 90 degrees out of phase, the signal G will take the form shown as $G_2$; and the phase detected output G, as averaged by the filter 260, will be essentially zero in this case. The output G of the phase detector can be either positive or zero (as shown) or negative, depending upon the phase angle between the signal frequency and the reference frequency. However, positive pulses are used to energize the relays of the logic circuit, shown at 270, which is preferably included in the embodiment of FIGURE 4.

The logic circuit 270 generally utilizes electromagnetic devices such as relays, but it shall be fully understood that other logic switching circuitry may be adapted, such as electronic lock circuits, electronic binary circuits used as switches employing transistors or vacuum tubes, and mechanical sequential systems, including commutators and ratchet interlock devices.

When describing the relative motion of the source scene 2, it shall be understood that this refers to the motion of the image of the source scene 2 at the striated plate 18 due to the relative motion between the sensor vehicle and the sought source or target 2 and is beyond that motion of the image produced when the source scene 2 and the sensor 10 are at relative rest.

When there is no relative motion of the source scene 2, the output voltage G and G' of the phase detectors 50 and 51 respectively, as filtered H and H', are of a steady value D.C. However, when there is relative motion, the phase detected outputs G and G', as filtered H and H', generate sine waves of slowly changing amplitude whose frequency that is low compared with the carriers. If these sine waves are considered as being propagated in the direction of image slip, direct proportional control is available only when the slope of the governing phase detected output, output G as shown, is positive with respect to the direction of signal slip. The logic circuit 270 is provided to slug servo amplifier 300 whenever the governing phase detected output is of improper polarity or whenever the slope of that output is improper for control purposes. Two separate phase detected signals G and G' are required to determine the relative change of the phase angle between these outputs, and thereby operate the logic circuit 270 correspondingly. Since servo amplifier 300 is intended to drive a servo motor 380 in one direction when the input is positive, and oppositely when the input is negative, the D.C. power source, shown illustratively as a battery 290, should be of adequate capacity to override any signal received directly from the phase detector 50.

Operation of the various relays in logic circuit 270 is defined in Table 1 and Table 2. When the signal G leads signal G' and both signals start from zero, the following sequence will be realized as illustrated in Table 1. When the signal G' leads signal G and both signals start from zero, the following sequence will be realized as illustrated in Table 2.

*Table 1*

| Relay 272 | Relay 274 | Relay 276 | Relay 278 | Input to Amplifier 300 |
|---|---|---|---|---|
| Not energized. | Not energized. | Not energized. | Not energized. | Signal H=0. |
| Energized. | do. | do. | do. | Signal H. |
| Do. | Energized. | Energized. | do. | Slug plus. |
| Not energized. | do. | do. | do. | Do. |
| Do. | Not energized. | do. | do. | Do. |
| Energized. | do. | Not energized. | do. | Signal H. |

Table 2

| Relay 272 | Relay 274 | Relay 276 | Relay 278 | Input to Amplifier 300 |
| --- | --- | --- | --- | --- |
| Not energized. | Not energized. | Not energized. | Not energized. | Signal H=0. |
| Do | Energized | do | Energized | Slug minus. |
| Energized | do | do | do | Do. |
| Do | Not energized. | do | do | Do. |
| Not energized. | do | do | Not energized. | Signal H. |
| Do | Energized | do | Energized | Slug minus. |

The servo amplifier 300 is designed to drive a servo motor 380 and the associated controls, not shown, in order to achieve zero output from the governing phasesensitive detector, i.e. detector 50 as shown. When the signal G, as averaged by filter 260, is of zero voltage, there is no input to servo amplifier 300; and therefore, the servo motor 380 is inoperative. Damping circuits may be included to reduce "hunting" of servo motor 380.

When the image of scene 2 is oscillated across the parallel bands of plate 18, points of contrast in the image scene 2 produce a variety of electrical responses from photocell 10. Depending upon the relative location of the paths of these individual points on the bands of plate 18, some of the resulting signals will cancel and still others will reinforce each other. The output of photocell 10 thus represents the instantaneous algebraic sum of the effects of the contrast points of the image scene 2. Therefore, the output of photocell 10 is comprised of a number of alternating components which exist at the fundamental frequency of image oscillation and various harmonics.

In order that the character of the electrical signals from photocell 10 may become more apparent, examples with reference to FIGURE 6 and FIGURE 7 shall be considered. If all the points of contrast in a complex target scene 2 could be reduced to a single image area defining a point 80a as represented in FIGURE 6, the excursion of that point 80a could be directed to occur over one full grid spacing or pitch 86 of the plate 18, the plate 18 being comprised of equal width parallel bands or spacings of alternating transparent material 84 and opaque material 82. If the excursion of image area 80a begins with area 80a centered on the leading edge of one opaque band or spacing 82 as shown in FIGURE 6(L), and if the area 80a has a diameter equal to one half of grid pitch or spacing 86, the photocell 10 will produce substantially the signal shown in FIGURE 7(L). By inspection, this wave consists of the fundamental combined with the third harmonic.

Furthermore, movement of the source scene 2 may cause relocation of image area 80a in such a manner that its excursion is displaced by one half of grid spacing 86 to the position shown in FIGURE 6(N). In this instance, the photocell 10 will produce substantially the signal shown in FIGURE 7(N) wherein the phase of the output will be shifted approximately 180 degrees.

In addition, movement of the source scene 2 may cause relocation of less than one half of grid spacing 86 resulting in an emphasis of certain harmonics rather than a shift in the phase of the photocell output. This situation is illustrated in FIGURE 6(M) wherein the contrast area 80b, characteristically identical with area 80a, makes an excursion between the extreme positions as shown. In this instance, photocell 10 will produce substantially the signal shown in FIGURE 7(M).

By inspection, this wave is the second harmonic. FIGURE 6(P) and FIGURE 7(P) show relocation of area 80b by a distance of one half of grid pitch 86.

When relocation of the image of the contrast area 80b is equivalent to one half the grid spacing, the phase shift of the photocell output is approximately 180 degrees; but when relocation of less than one half spacing occurs, emphasis of certain harmonics results rather than a shifting of the phase of the photocell output. Only signals in phase or 180 degrees out of phase need be considered for determining movements of the source scene 2. These phase reversals are sensed by phase-detectors 50 and 51 whose pulsating output to servo amplifier 300 varies accordingly as described above. The demodulators 50 and 51 operate on any two harmonics, such as the second and third harmonics, of the signal generated by the photocell 10, to produce a D.C. voltage at low pass filters 260 and 261 thereby generating signals H and H', respectively. The demodulators or detectors 50 and 51 may utilize any group of harmonics and for the purpose of illustration, the second and third harmonics were adopted.

Targets or scenes 2 consisting of complex arrays of optically contrasting areas or points will produce from the sensor or photocell 10 signals comprised of any of a number of harmonics; and at any given instant, one form will dominate depending upon the averaging done by the photocell 10. However, the higher harmonics have increasingly weaker signals; and hence are progressively more difficult to employ.

With reference to a specific situation where the distance between the device or vehicle carrying the sensor 10 and the source-scene 2 is being diminished, the included angle of the cone of view will remain constant, and the circular area or target of terrain under surveillance will be successively smaller for each position of progressively reduced intervening distance. This reduction in the viewed amount of the original target results in a change in the size or location of the image or target areas and these images or target areas exhibit a higher contrast and exercise greater influence. This series of progressively more distinct image or target areas provides a succession of targts all of which are within the originally aimed-at target scene.

Furthermore, by varying the grid pitch or spacing 86 and/or the parameters of the optical system, an area of contrast discernment may be selected for the most suitable distant range of operation.

The foregoing description considers a guidance system operable about a single axis wherein the slip of image area 2 parallel to the striations would yield no apparent change in the output; and consequently only the component of slip perpendicular to the striation would result in a phase or harmonic content change in the signal from which the intelligence is desired.

For two dimensional slip, an extension of the present invention to include two-axis or multi-axis operation would merely require duplication of certain elements and incorporation of an image dividing optical system as shown in FIGURE 8, wherein there is no change in the basic principle being involved. The two-axis operation also can be achieved by two completely separate systems of the embodiment described hereinabove.

In FIGURE 8, the beam-splitting unit 4 is optically arranged to divide the rays of light coming from source scene 2. The beam splitting unit 4 may be, for example, a cube, as shown at 4 made up of two prisms with a reflective material applied to the cemented surfaces so that approximately equal amounts of light are transmitted to photocell 10 and to photocell 11 respectively, as by means of flat reflecting mirror 6.

The second striated plate 19 or modulating screen is arranged with its parallel bands at right angles to the parallel bands of plate 18 in order to sense the movements of the source scene 2 in the two axis system. Furthermore, a two axis control may be achieved in a single axis system by superimposing at right angles one modulating screen, such as the striated plate 18 above another modulating screen, such as the striated plate 19 or by providing geometrical proximity of both screens positioned at right angles within the image area.

Furthermore, movements of the source scene 2 in two axes can be sensed by the arrangement of FIG. 1, providing there is employed, instead of striated plate 18 a plate with one or more symmetrical perforations, for example square or circular perforations. One perforation allows development of adequate signals for two-axis guidance on a source scene 2 providing that the area of the source scene 2 which is collected by mirror 16 has contrast gradients in at least two essentially perpendicular directions. Since this condition of contrast gradients does not always exist in target scenes toward which guidance is desired, a plurality of perforations are preferably employed as shown in FIG. 9.

The perforations 87 are transparent whereas the remainder of the plate 88 is opaque. The perforations 87, in addition, have their diameter or major dimension approximately equal to the diameter of the circular excursion of the image. This approximate equality in diameters allows generation of signals which can be conveniently handled by the circuit means described in conjunction with FIG. 1. In one specific embodiment, four 0.020 inch perforations are arranged in a square on 0.040 inch centers.

Unlike the arrangement employing a striated plate wherein the component of image motion parallel to the bands is considered spurious, for two-axis operation with the perforated plate of FIG. 9, the fundamental frequency signal may be advantageously employed because maximum information about the relative position of source scene 2 is contained in the two quadrature phases of the fundamental. Therefore, for two-axis operation with this perforated plate, filter 125 becomes a band-pass filter tuned to the fundamental frequency. Quadrature references are also established for detectors 50 and 51, for example by employing two one-bar commutators arranged 90 degrees apart on shaft 32 as the demodulators.

Two-axis operation employing this perforated plate is shown schematically in FIG. 10 wherein sensor 10 views source scene 2 through the transparent nose cone 90 of missile 98. The optical elements, lens 14, mirror 16 and the perforated plate of FIGURE 9 are shown enclosed in a suitable housing 97. The phase-sensitive detectors 50 and 51 direct quadrature control surfaces 95 and 96 respectively through servo amplifiers 300, servo motors 380, gearing 91 and 93 and shafts 94, not shown, and 92 in order to guide missile 98 towards scene 2.

The following descriptions of circuits which may advantageously be used are given with reference to FIGS. 11–14.

As shown in FIG. 11, the modulated signal from the photocell 10 is condenser-coupled through the condenser 102 to the grid of a triode tube 104, the resistor 106 providing a contact potential bias. The tube 104 acts as an RC coupled amplifier stage; and the resistor 108, capacitor 110 and the resistor 112 serve as the essential coupling elements. The impedance of resistor 108 and the plate resistance of tube 104 in parallel, and the capacitor 114 act as a low pass filter to reject the noise and the higher frequency harmonics of the modulated signal. The triode 116 is connected as a cathode follower to provide a low impedance drive for a parallel-T filter 125. The resistor 118 is a cathode follower load resistor. Coupling between the cathode follower and the parallel-T network is through the capacitor 120.

The parallel-T filter 125 consists of a capacitor 126, capacitor 128, capacitor 130, resistor 132, resistor 134 and resistor 136 wherein said filter 125 is tuned to reject the fundamental frequency, namely, 200 cycles in this instance, which is contained in the modulated signal from the photocell 10.

The pentode tube 140 and the resistor 142, resistor 144, capacitor 146, and the capacitor 148 act as an RC-coupled pentode amplifier stage. The resistor 142 and the capacitor 150 provide a low pass filter to reject the noise and the higher modulation harmonics. The triode 152, the resistor 154 and the resistor 156 circuitwise act as a cathode follower to provide a low impedance drive to the transformer 158 coupled through the coupling condenser 159. An automatic gain control circuit shown as 160 is provided to maintain a constant signal amplitude to the 400 cycle phase detector 51 and the 600 cycle phase detector 50. The constant signal amplitude is provided to maintain approximately a constant servo loop gain for the circuit. The automatic gain control function is accomplished in the following manner: The triode tube 162, the condenser 164, resistor 166, resistor 168 and the resistor 170 function as an A.C. amplifier. The signal from the plate of the tube 162 is coupled to bias the tube 172 through the resistor 174. When the voltage on the plate of the tube 162 is driven more positive than the bias set at the cathode of the tube 172 by the potentiometer 176, the tube 172 conducts thereby charging the capacitor 178 negatively thereby applying a negative bias to the grid of the remote cutoff pentode 140 through the resistor 180, the resistor 132 and the resistor 134. The resistor 182 discharges the condenser 178 at a time constant determined by the RC product when the signal level on the plate of the tube 162 falls below the bias setting of the cathode of the tube 172.

The overall gain from the input of the tube 104 to the output of the tube 152 without automatic gain control is approximately 2,500. In practice, when the signal input to the tube 104 is at a maximum, the automatic gain control circuit reduces the overall gain to approximately 200. Resistor 184 and condenser 186 in combination provides a low pass filter on the B supply in order to provide isolation and additional ripple filtering in the circuit.

With reference to FIG. 13, the signal A' from the phase adjuster 71 is resistance coupled through the resistor 203 to the grid of the triode tube 205 of the squaring amplifier 201. The resistor 207 is the plate resistor of the tube 205. The capacitor 209 acts as decoupling condenser. The diode 211 and the output impedance of the tube 205 in series with the resistor 213 produce a clipping action to provide an essentially square wave to the primary of the transformer 53 through the resistor 55. The diode 57 acts as a D.C. current restorer for the transformer 53. The two secondary windings of the transformer 53 in combination with the resistor 59, the diode 61 and the diode 63 provide a switch action at the 400 cycle frequency. The potentiometer 59 provides a balance control to zero the switching demodulator or phase detector 51. The output of the phase detector 51 derived from the junction of diodes 61 and 63 is coupled through the low pass filter 261 consisting of a resistor 263 and a condenser 265, into the logic computer 270.

With reference to FIG. 14, the signal A from the phase adjuster 70 is resistance coupled through the resistor 202 to the grid of the triode 204 of the squaring amplifier 200. The choke 216 and the capacitor 218 are tuned to 1200 cycles per second and this circuit acts as the plate load for the tube 204. This tuned circuit selects the third harmonic from the clipped 400 cycle squared wave. This third harmonic signal is applied through the condenser 222 and resistor 224, and the resistor 226 to the grid of the triode tube 228 of the squaring amplifier 220. The resistor 230 is the plate resistor for the tube 228. The combination of a condenser 232, the resistor 234 and the diode 236 provide a pulse slope discriminating coupling between the plate of the tube 228 and the cathodes of the tubes 241 and 242, respectively, of the bi-stable multivibrator, or trigger circuit 240. These three components provide a low impedance coupling for the negative pulses and a high impedance coupling for the positive pulses. The utilization of the triode tubes 241 and 242 in combination with the resistors 243 through 249 inclusive, and the capacitors 250 and 251 are arranged to act as a D.C. coupled bi-stable multivibrator or trigger circuit and produce a factor of two frequency division. The output of the bi-stable multivibrator 240 into the plate of the tube 242 is thus an essentially 600 cycle square wave synchronized and phase adjusted with respect to the 400 cycle square wave from the squaring amplifier 201.

The condenser 252 acts as a decoupling condenser in this circuit. The diode 254 and the output impedance of the tube 242 in series with the resistor 256 produces a clipping action so as to provide an essentially square wave to the primary of the transformer 52 through the resistor 54 of the phase detector circuit 50. The diode 56 provides a D.C. current component in order to restore the D.C. level for the transformer 52. The two secondary windings of the transformer 52 in combination with the resistor 62, the diode 58 and the diode 60 provide a switch action at the 600 cycle frequency. The resistor 62 provides a balance control to zero the switching demodulator or phase detector 50. The demodulator or phase detector 50 output from the junction of the diodes 58 and 60 is coupled through a low pass filter 260, containing a resistor 262 and a capacitor 264, and then to the logic circuit computer 270 in order to operate the servo amplifier 300.

With reference to FIG. 12 which shows one specific embodiment of servo amplifier 320, the demodulated and smoothed signal from filter 260 is applied to the grid of cathode follower tube 302. The resistors 304 and 306 act as the cathode load resistor for tube 302. The resistor 304 is used as a zeroing potentiometer. The signal from tube 302 is D.C. coupled through resistor 308 to the base of transistor 310. The transistors 310 and 312, and the resistors 314, 316 and 318 act as a balanced common collector transistor amplifier. The resistor 320 and capacitor 322 act as an integral network to provide shaping of the gain phase characteristic of the servo amplifier 300. The differential outputs at emitters of diodes 310 and 312 are direct coupled to the bases of diodes 324 and 326, which in combination with resistors 328, 330 and 332 act as a balanced grounded emitter amplifier. The differential outputs at the collectors of diodes 324 and 326 are direct coupled to the bases of diodes 334 and 336, which in combination with resistors 338 and 340, and resistor 342 act as a balanced-grounded-collector driver stage. The differential outputs from the emitters of diodes 334 and 336 are direct coupled to the bases of diodes 344 and 346 through resistors 348 and 350. The diodes 344, 346, 352 and 354 in combination with resistors 356, 358, 360, 362 and 364 act as a bi-directional direct current power output stage in a bridge configuration, which stage functions to control the amplitude and polarity of D.C. current and voltage applied to D.C. servo motor 380.

With equal input voltages applied to the bases of diodes 344 and 346, the emitters of the diodes 344 and 346 are at the same potential and no output signal is applied to the D.C. servo motor 380. The diodes 344, 346, 352 and 354 arranged as shown draw a quiescent current at balance of approximately 1.5 amperes through resistor 356. When a differential signal is applied to the bases of the diodes 344 and 346 from the emitters of the diodes 334 and 336, the emitter voltages of the diodes 344 and 346 follow this change. This differential voltage is also applied-cross-coupled to the bases of the diode 352 and diode 354 through resistors 358, 360, 362 and 364. The resultant current re-distribution through the now-unbalanced bridge develops a D.C. current through D.C. servo motor 380. The amplitude and polarity of this D.C. voltage are directly controlled by the polarity and amplitude of the differential voltage at the emitters of the diodes 334 and 336. The transconductance of the transistorized bi-directional D.C. servo amplifier 300 from the input grid of tube 302 to the D.C. servo amplifier 300 from the input grid of tube 302 to the D.C. servo motor load is approximately 10,000,000 micromhos. The capacitors 366, 368, resistors 308, 370 and 372 act in combination as a phase angle lead and integrating network in the feedback loop of servo amplifier 300. These components act in combination with capacitor 322 and resistor 320 to shape the gain phase characteristics of the servo amplifier 300 to accomplish servo loop stabilization.

In the drawings the output of the servo motor is directed generally to the controls. The controls must operate or be operated by auxiliary controls whereby some means, either by a human being directly or through some medium such as a digital computer that is following human direction, directs the vehicle sensor so as to sight the target or the object in the field of view, and then said vehicle is informed to hold this target or object in the field of view despite the relative motion between the sensor and the sought after target.

Associated equipment, such as sighting devices and stabilizing gyroscopes, not a part of the present invention, may be provided as required. For example, the embodiment of FIG. 8 may be arranged with a gyroscope and torquers to provide an indication of drift or ground speed/altitude for the vehicle, such as a transporting aircraft. The torquers through the action of the gyroscope control the motion of the optical system to lock onto a succession of ground targets. It shall be understood that the ratio of the required torques to be applied with reference to the pitch and roll of the aircraft shall be properly modified to indicate substantially the tangent of the drift angle.

While I have illustrated and described one specific form and function which my invention may assume, it will be understood that the invention is not restricted to the particular constructions and arrangements shown, but may be variously modified within the scope of the following claims.

I claim as my invention:

1. Guidance control apparatus responsive to radiation signals, comprising a radiation sensitive element adapted to generate electrical signals from the impinging radiation signals representative of a selected target scene image, fixed amplitude conical scanning means comprising an off-axis rotatable optical system and at least one modulating member, said off-axis rotatable optical system being adapted to direct said radiation signals through said modulating member to impinge upon said radiation sensitive element, said modulating member being substantially opaque to said radiation signals and containing at least one area transparent to said radiation signals, drive means coupled to said conical scanning means for nutating said radiation signals at said modulating member at a predetermined frequency to generate harmonics of the predetermined nutation frequency in the output of said radiation sensitive element wherein the amplitude and phase characteristics of a selected odd harmonic are related to the relative angular position of said target scene image at said modulating member, and electronic circuit means comprising an amplifier coupled to the output of said radiation sensitive element for amplifying the output thereof, a parallel-T filter network for rejecting said predetermined nutation frequency, phase-sensitive detector circuit adapted to pass a selected odd harmonic of said predetermined nutation frequency, and averaging filter circuit for converting the selected odd harmonic output of said phase-sensitive detector circuit to provide control signals whose amplitude and polarity are proportional to the amplitude and phase of said selected odd harmonic and representative of the position of said target scene relative to said apparatus.

2. Control apparatus responsive to radiation signals, comprising a radiation sensitive element adapted to generate electrical signals from the impinging radiation signals representative of a selected target scene image, conical scanning means comprising a rotatable optical system and at least one modulating member, said rotatable optical system having its axis of rotation define a small angle with respect to its optical axis and being adapted to direct said radiation signals through said modulating member towards said radiation sensitive element, said modulating member being substantially opaque to the radiation signals and containing at least one area transparent to said radiation signals, drive means coupled to said rotatable optical system for nutating the radiation signals at said modulating member at a predetermined frequency to thereby create harmonics of said predetermined nutation frequency in the output of said radiation sensitive element, wherein the amplitude and phase characteristics of a selected odd harmonic are related to the relative angular position of said target scene image at said modulating member, and circuit means comprising an amplifier coupled to the output of said radiation sensitive element for amplifying the output thereof, a filter network for rejecting said predetermined nutation frequency, and phase-sensitive detector circuit connected to said filter network and responsive thereto for converting the amplitude and phase characteristics of said selected odd harmonic into varying control signals whose amplitude and polarity are proportional to the amplitude and phase of said selected odd harmonic and representative of the position of said target scene relative to said apparatus.

3. Control apparatus responsive to radiation signal data in accordance with claim 2 wherein said optical means for directing said radiation signal data towards said radiation sensitive device further comprises a Cassegrainian reflector.

4. Control apparatus responsive to radiation signal data in accordance with claim 2 wherein said optical means for directing said radiation signal data towards said radiation sensitive device further comprises rotatably mounted refracting prism means.

5. Control apparatus responsive to radiation signal data in accordance with claim 2 wherein said optical means for directing said radiation signal data towards said radiation sensitive device further comprises rotatably mounted focusing reflective means.

6. Control apparatus responsive to radiation signals representative of a selected target scene, comprising a radiation sensitive element adapted to generate electrical signals from said radiation signals, fixed amplitude conical scanning means comprising a rotatable optical system and at least one striated member, said rotatable optical system having its rotation axis define a small angle with its optical axis and being adapted to direct said radiation signals through said striated member towards said radiation sensitive element, synchronous polarized hysteresis motor means coupled to said conical scanning means for oscillating said radiation signals at said striated member at a predetermined frequency to thereby generate harmonics of said predetermined nutation frequency in the output of said radiation sensitive element, wherein the amplitude and phase characteristics of selected harmonics are related to any relative angular excursion of said target scene, circuit means comprising an amplifier coupled to the output of said radiation sensitive element for amplifying the output thereof, a filter network adapted to reject said predetermined frequency, and an automatic gain control circuit connected to maintain a constant signal level at the output of said amplifier, and detector means comprising at least one phase-sensitive detector and output filtering means, said detector being adapted to convert one or more selected odd harmonics in the amplified and filtered signals into control signals whose amplitude and polarity are proportional to the amplitude and phase of said selected odd harmonics and representative of the degree and direction of said relative angular excursion.

7. Guidance apparatus responsive to radiation signals representative of a selected target scene for controlling the travel of a vehicle towards said target scene, comprising a radiation sensitive element adapted to generate electrical signals from said radiation signals, scanning means comprising an oscillatable optical system and a striated member, said oscillatable optical system being adapted to direct said radiation signals through said striated member towards said radiation sensitive element, said striated member having portions thereon alternately opaque and transparent to said radiation signals, oscillating means coupled to said scanning means for oscillating the radiation signals at said striated member at a predetermined frequency, to create harmonics of the oscillation frequency in the output of said radiation sensitive element, wherein the amplitude and phase characteristics of selected harmonics are related to any relative angular excursion of said target means, broad band amplifier circuit comprising an amplifier and filter network, said amplifier being coupled to the output of said radiation sensitive element for amplifying the output thereof, said filter network being adapted to reject the fundamental oscillatory frequency, and one or more phase-sensitive detector circuits having associated output filters, said phase-sensitive detector circuit being connected to the output of said amplifier circuit and adapted to pass a selected odd harmonic of said oscillation frequency as sine-loop pulses, said associated output filter being adapted to average the sine-loop pulse output of said phase-sensitive detector circuit to provide control signals whose amplitude and polarity are proportional to the amplitude and phase of said selected odd harmonic and representative of the degree and direction of any relative angular excursion.

8. Guidance apparatus responsive to radiation signals representative of a selected target scene for controlling the travel of a vehicle towards said target scene, comprising an A.C. source, a radiation sensitive element adapted to generate electrical signals from said radiation signals, fixed amplitude conical scanning means comprising an off-axis rotatable optical system and a striated member, said rotatable optical system having its axis of rotation define a small angle with respect to its opical axis and being adapted to direct said radiation signals through said striated member towards said radiation sensitive element, synchronous polarized hysteresis motor means powered by said A.C. source and coupled to said rotatable optical system to effect the oscillation of said radiation signals at said striated member at a predetermined frequency to thereby generate harmonics of the predetermined oscillation frequency in the electrical signal output of said radiation sensitive element, said harmonics having amplitude and phase characteristics related to any relative angular excursion of said target scene, circuit means comprising an amplifier coupled to the output of said radiation sensitive element for amplifying the output thereof, a filter network for rejecting the predetermined oscillation frequency component in the amplified electrical signals, an automatic gain control circuit for maintaining the level of the amplified and filtered electrical signals at a constant level, and a phase-sensitive detector circuit for converting characteristics of at least one selected odd harmonic in the amplified and filtered output of said radiation sensitive element into varying control signals, the amplitude and polarity of said varying control signals being proportional to the amplitude and phase of said selected odd harmonic and representative of the degree and direction of any relative angular excursion, frequency converting reference circuit means comprising phase adjusting apparatus connected to said A.C. source, a squaring circuit connected to the output of said phase adjusting apparatus, a frequency multiplication circuit responsive to the output of said squaring circuit, and a frequency dividing circuit processing the output of said frequency multiplication circuit, said frequency converting reference circuit means being connected at its output to said phase-sensitive detector circuit to provide a reference signal for the latter related to the predetermined oscillation frequency, and servo apparatus connected to said phase-sensitive detector circuit and responsive to said varying control signals for correcting any relative angular excursion and directing the vehicle towards said target scene.

9. Guidance apparatus responsive to the image of a selected target scene for controlling the travel of a vehicle towards said selected target scene, comprising an A.C. source, a radiation sensitive element adapted to generate electrical signals representative of said selected target scene image, scanning means comprising a rotatable focusing optical system and at least one space filtering member, said rotatable focusing optical system being adapted to direct the radiated image of the selected target scene through said space filtering member onto said radiation sensitive element, said space filtering member having a pattern composed of a plurality of areas alternately transparent and opaque to the radiated image received from the selected target scene, drive means powered by said A.C. source and coupled to said scanning means for oscillating the image of said selected target scene across said space filtering member at a preselected frequency to thereby generate harmonics of said preselected frequency in the output of said radiation sensitive element, wherein the amplitude and phase characteristics of a selected odd harmonic are related to any relative angular change in position of said selected target scene, circuit means comprising an amplifier and a band-pass filter tuned to the oscillation frequency, said amplifier being connected to said radiation sensitive element for amplifying the output thereof, said band-pass filter being adapted to filter the amplified signal to remove the fundamental oscillation frequency component thereof, detector means comprising a phase-sensitive detector circuit and an output filter connected to the output of said circuit means for converting the amplified and filtered signals into varying control signals, the amplitude and polarity of said varying control signals being proportional to the amplitude and phase of a selected odd harmonic of the oscillation frequency and representative of the degree and direction of said relative angular excursion, frequency converting reference circuit means comprising phase adjusting apparatus connected to said A.C. source, a squaring circuit connected and responsive to the output of said phase adjusting apparatus, a frequency multiplication circuit responsive to the output of said squaring circuit, and a frequency dividing circuit processing the output of said frequency multiplication circuit, said frequency converting reference circuit means being connected at its output to said phase-sensitive detector circuit to provide a reference signal frequency for the latter, said reference signal frequency being that of said selected odd harmonic, and servo means comprising servo amplifier means and servo motor means responsive to said control signals for controlling the travel of said vehicle towards said selected target scene.

10. Guidance apparatus in accordance with claim 9, wherein said phase sensitive detector circuit comprises at least two phase sensitive detectors each responsive to a quadrature phase of the oscillatory frequency.

11. An optical-electrical device responsive to angular motions of a target area comprising the improvement of optical means comprising a focusing optical system for directing radiation received from said target area through a space filter, a radiation sensitive element positioned to receive radiation passed through said space filter and adapted to generate electrical signals representative thereof, cyclically operable means associated with said radiation sensitive means for generating harmonics in the electrical signal output thereof, said harmonics having phase and amplitude characteristics which vary with change in position of said space filtering member relative to said target area, a filter network for filtering said electrical signals to remove the cyclical frequency component thereof, detector means comprising a phase-sensitive detector circuit and a frequency converting reference circuit connected to the output of said filter network for determining the amplitude and phase of at least one selected odd harmonic of the cyclical frequency to obtain control information indicative of any relative change in position between said target area and said device, and means for employing the control information to direct the device to sustain its view of the target area.

12. A method for sustaining surveillance of a target area comprising the steps of optically directing radiation received from said target area through a space filter to impinge upon a radiation sensing element, cyclically nutating said radiation at said space filter to generate harmonics of said cyclical nutation frequency in the output of said radiation sensitive element, filtering the output of said radiaiton sensitive element to remove the fundamentally cyclical nutation frequency, and applying said space filtered output to phase-sensitive detector means responsive to at least one selected odd harmonic of said fundamentally cyclical nutation frequency to obtain control signals therefrom, having polarity and amplitude characteristics proportionally to the amplitude and phase of said one selected harmonic contained in said output and representative of relative movements of said target area.

13. A method for sustaining surveillance of a moving target area in accordance with claim 12 further comprising the step of utilizing said control signals for directing said radiation sensitive device to sustain its surveillance of said target area.

14. An optical-electrical device responsive to angular motions of a target area comprising the improvement of oscillatory means for generating electrical signals containing an odd harmonic of the oscillatory frequency whose phase and amplitude are representative of the relative angular position of the target area, means for filtering said electrical signals to remove the oscillatory frequency component thereof, detector means comprising phase-sensitive detector means and a frequency converting reference circuit connected to the output of said filtering means for determining the amplitude and phase of at least one odd harmonic of the oscillatory frequency to obtain control information indicative of any relative change in position between said target area and said device, and means for employing the control information to direct the device to sustain its view of the target area.

15. An optical-electrical device in accordance with claim 14 wherein said detector means comprises one or more commutators coupled to said rotatable means and adapted to extract control information from the modulated electrical signals.

16. An optical-electrical device in accordance with claim 14 wherein said detector means comprises a pair of phase-sensitive detectors having a varying D.C. voltage output forming said control information.

17. An optical-electrical device in accordance with claim 16 further comprising logic circuit means responsive to the control information at the output of said phase sensitive detectors to provide slugging signals to said means for employing the control information whenever the slope of said output is improper for control purposes.

18. An optical-electrical device in accordance with claim 14 wherein said detector means comprises at least one phase-sensitive detecting transformer-and-diode circuit referenced to said means for generating electrical signals.

19. An optical-electrical device in accordance with claim 14 wherein said oscillatory means for generating electrical signals containing an odd harmonic of the oscillatory frequency include photosensitive means, a lens, a striated plate and rotatable optical means whose axis of rotation defines a small angle with its optical axis.

20. An optical-electrical device in accordance with claim 19 wherein a duplicate device is arranged therewith, the striations of the respective striated members being located at mutual right angles so as to provide control information about said relative angular movements of said target area in two axes.

21. An optical-electrical device in accordance with claim 14 wherein said oscillatory means for generating electrical signals containing an odd harmonic of the oscillatory frequency include a photoelectric cell, a lens, a Cassegrainian reflector, a striated plate, and rotatable optical means whose axis of rotation defines a small angle with its optical axis.

22. An optical-electrical device in accordance with claim 14 wherein said oscillatory means for generating electrical signals containing an odd harmonic of the oscillatory frequency include a photoelectric cell, a lens, a striated plate, and rotatable optical means including a prism whose axis of rotation is coincident with the optical axis of the lens and striated plate.

23. An optical-electrical device in accordance with claim 14 wherein said oscillatory means for generating electrical signals containing an odd harmonic whose phase and amplitude are representative of the relative angular position of the target area include a photoelectric cell, a lens, a modulating member having a pattern comprised of a plurality of areas alternately transparent and opaque to the radiation received from the target area, and rotatable optical means including a focusing reflective member whose axis of rotation defines a small angle with its optical axis and whose axis of rotation is coincident with the optical axis of the lens and modulating member.

24. A multi-axis control apparatus responsive to radiation signal data representative of a selected target scene, comprising a plurality of radiation sensitive devices adapted to generate electrical signals representative of said selected target scene; an associated optical beam splitting system coupled to multi-optical means for directing said radiation signal data towards each of said radiation sensitive devices; drive means coupled to each of said multi-optical means for nutating the image of said selected target scene at a predetermined frequency for emphasizing or de-emphasizing harmonics modulating said predetermined nutation frequency in said radiation signal data received by said plurality of radiation sensitive devices, said harmonics and their phase being indicative of the relative angular excursions of said target scene; circuit means connected to each of said radiation sensitive devices for amplifying and filtering the modulated electrical signals at the output thereof; and phase sensitive means connected to the output of each of said circuit means for converting at least one selected odd harmonic in the amplified and filtered signals into control signals having a constant value when no relative angular excursion occurs between said radiation sensitive devices and said target and having a polarized varying value when a relative angular excursion of said target scene exists; the amplitude and polarity of said varying control signals being representative of the degree and direction of said relative angular excursion.

25. A multi-axis control apparatus responsive to radiation signal data representative of a selected target scene; comprising a radiation sensitive device adapted to generate electrical signals representative of said selected target scene; optical means for directing said radiation signal data towards said radiation sensitive device; said optical means including a plurality of striated members arranged at right angles to each other; drive means for oscillating a portion of said optical means at a preselected frequency for causing the radiation signal data as passed by said striated members and received by said radiation sensitive device to be modulated by harmonics of said preselected frequency which harmonics by their emphasis are indicative of the relative angular excursions of said target scene; circuit means connected to the said radiation sensitive device at the output thereof for amplifying the modulated electrical signals and filtering out the fundamental oscillatory frequency; and phase sensitive detector means connected to the output of said circuit means and sensitive only to specific phases of at least two selected harmonics of the oscillatory frequency for converting the amplified and filtered signals into control signals; said control signals having a constant value when no relative angular excursion occurs between said radiation sensitive device and said target scene and having a polarized varying value when a relative angular excursion of said target scene exists; the amplitude and polarity of said varying control signals being representative of the degree and direction of said relative angular excursion.

References Cited in the file of this patent

UNITED STATES PATENTS

| | | |
|---|---|---|
| 2,423,885 | Hammond | July 15, 1947 |
| 2,425,541 | Konet | Aug. 12, 1947 |
| 2,431,625 | Tolson | Nov. 25, 1947 |
| 2,517,702 | Offner | Aug. 8, 1950 |
| 2,713,134 | Eckweiler | July 12, 1955 |
| 2,763,177 | Taylor | Sept. 18, 1956 |
| 2,820,906 | Miller | Jan. 21, 1958 |
| 2,826,380 | Ketchledge | Mar. 11, 1958 |
| 2,939,962 | Miller | June 7, 1960 |
| 2,981,842 | Kaufold | Apr. 25, 1961 |